(12) United States Patent
Yang (10) Patent No.: US 8,908,974 B2
(45) Date of Patent: Dec. 9, 2014

(54) IMAGE CAPTURING DEVICE CAPABLE OF SIMPLIFYING CHARACTERISTIC VALUE SETS OF CAPTURED IMAGES AND CONTROL METHOD THEREOF

(75) Inventor: Tai-Chang Yang, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 380 days.

(21) Appl. No.: 13/431,480

(22) Filed: Mar. 27, 2012

(65) Prior Publication Data
US 2013/0170700 A1 Jul. 4, 2013

(30) Foreign Application Priority Data

Dec. 30, 2011 (TW) .............................. 100149685 A (51) Int. Cl.
*G06K 9/46* (2006.01)
*G06K 9/62* (2006.01)

(52) U.S. Cl.
USPC .......................................... 382/190; 382/209

(58) Field of Classification Search
CPC .. G06K 9/6203; G06K 9/6211; G06K 9/6298
See application file for complete search history.

(56) References Cited

U.S. PATENT DOCUMENTS

| | | | | |
|---|---|---|---|---|
| 5,982,912 | A * | 11/1999 | Fukui et al. ..................... | 382/118 |
| 7,372,981 | B2 * | 5/2008 | Lai et al. ......................... | 382/118 |
| 7,689,034 | B2 * | 3/2010 | Terakawa ........................ | 382/159 |
| 8,126,206 | B2 * | 2/2012 | Tsurumi ......................... | 382/103 |
| 8,224,110 | B2 * | 7/2012 | Mishima et al. ............... | 382/264 |
| 8,238,666 | B2 * | 8/2012 | Besley et al. .................. | 382/203 |
| 8,315,465 | B1 * | 11/2012 | Baluja et al. ................... | 382/224 |
| 8,401,308 | B2 * | 3/2013 | Nakamura et al. ............. | 382/209 |
| 8,417,960 | B2 * | 4/2013 | Takahashi et al. ............. | 713/186 |
| 8,421,877 | B2 * | 4/2013 | Yang et al. .................. | 348/222.1 |
| 2012/0169860 | A1 * | 7/2012 | Lian et al. ........................ | 348/77 |
| 2013/0058579 | A1 * | 3/2013 | Kawanishi et al. ............ | 382/195 |

OTHER PUBLICATIONS

Beumer et al., "A landmark paper in face recognition", Proc. of the 7th International Conference on Automatic Face and Gesture Recognition, 2006.*

* cited by examiner

*Primary Examiner* — Anand Bhatnagar
*Assistant Examiner* — Soo Park
(74) *Attorney, Agent, or Firm* — Wang Law Firm, Inc.; Li K. Wang; Stephen Hsu (57) ABSTRACT

An image capturing device capable of simplifying characteristic value sets of captured images and a control method thereof. The image capturing device comprises a characteristic conversion module, a data storage module, a characteristic simplification module, a template storage module and a recognition module. The characteristic conversion module converts an image captured by the image capturing device into a characteristic image, and the characteristic image includes a group of first characteristic value sets. The data storage module stores a lookup table which comprises second characteristic value sets. The characteristic simplification module performs a simplification process according to the lookup table to produce a simplified group of characteristic value sets. Finally, compares the simplified group of characteristic value sets with the plurality of templates stored in the template storage module to recognize a specific object in the image.

8 Claims, 9 Drawing Sheets

IMAGE CAPTURING DEVICE CAPABLE OF SIMPLIFYING CHARACTERISTIC VALUE SETS OF CAPTURED IMAGES AND CONTROL METHOD THEREOF

CROSS-REFERENCE TO RELATED APPLICATION

This application claims the benefit of Taiwan Patent Application No. 100149685, filed on Dec. 30, 2011, in the Taiwan Intellectual Property Office, the disclosure of which is incorporated herein in its entirety by reference.

BACKGROUND OF THE INVENTION

1. Field of the Invention

The present invention relates to an image capturing device, and more particularly to the image capturing device capable of converting a captured image into a characteristic image, and simplifying a characteristic value set in the characteristic image to lower the memory requirements of the image capturing device and save the computing resources, and a control method thereof.

2. Description of Related Art

In recent years, electronic products come with increasingly lower prices and more powerful functions due to severe market competitions. Wherein, an object detection function has been introduced into various different image capturing devices such as digital still cameras, digital cameras, monitors and camera phones with different applications including human face recognition as well as recognitions of pedestrians, license plates, motor vehicles or other objects. However, an image capturing device with the object detection function generally requires lots of memories to store data such as human face characteristic templates and consumes a huge computing resource, so that the cost of the image capturing device will be increased significantly.

The aforementioned situation becomes more significant for compact handheld camera devices. With the consideration of costs, the resources of the compact handheld camera devices are very limited, particularly in the use of memories, since a high-end memory is expensive. Therefore, if it is necessary to integrate the objective detection function into the compact handheld camera device, the memory requirement is increased significantly, and the manufacturing cost is affected directly and the product competitiveness is dropped.

Therefore, it is an important issue for manufacturers to develop an image capturing device with the object detection function capable of saving the hardware cost of the image capturing device without affecting the accuracy of detecting the object.

SUMMARY OF THE INVENTION

In view of the foregoing shortcomings of the prior art, it is a primary objective of the invention to provide an image capturing device capable of simplifying characteristic value sets of captured images and a control method to overcome the conventional image capturing device with the object detection function that requires a large quantity of memories and computing resources, and results in a high cost.

To achieve the aforementioned objective, the present invention provides an image capturing device capable of simplifying characteristic value sets of captured images, and the image capturing device comprises: a characteristic conversion module, for converting a captured image into a characteristic image which includes a group of first characteristic value sets; a data storage module, for storing a lookup table which comprises second characteristic value sets; a characteristic simplification module, for executing a simplification process according to the lookup table, and deleting the first characteristic value set not existing in the lookup table from the group of first characteristic value sets, and replacing each deleted first characteristic value set by the second characteristic value set matching with a predetermined condition and existing in the lookup table, so as to generate a simplified group of characteristic value sets; a template storage module, for storing a plurality of templates; and a recognition module, for comparing the simplified group of characteristic value sets with the plurality of templates to recognize a specific object in the captured image.

To achieve the aforementioned objective, the present invention further provides an image capturing device capable of simplifying characteristic value sets of captured images, and the image capturing device comprises: a characteristic conversion means, for converting a captured image into a characteristic image which includes a group of first characteristic value sets; a data storage means, for storing a lookup table which comprises second characteristic value sets; a characteristic simplification means, for executing a simplification process according to the lookup table, and deleting the first characteristic value set not existing in the lookup table from the group of first characteristic value sets, and replacing each deleted first characteristic value set by a the second characteristic value set matching with a predetermined condition and existing in the lookup table, so as to generate a simplified group of characteristic value sets; a storage means, for storing a plurality of templates; and a recognition means, for comparing the simplified group of characteristic value sets with the plurality of templates to recognize a specific object in the captured image.

To achieve the aforementioned objective, the present invention further provides a control method of an image capturing device capable of simplifying characteristic value sets of captured images, and the method comprises the steps of: converting a captured image into a characteristic image by a characteristic conversion module, and the characteristic image including a group of first characteristic value sets; storing a lookup table by a data storage module, the lookup table comprising second characteristic value sets; executing a simplification process by a characteristic simplification module according to the lookup table, and deleting the first characteristic value set not existing in the lookup table from the group of first characteristic value sets, and replacing each deleted first characteristic value set by the second characteristic value set matching with a predetermined condition and existing in the lookup table, so as to generate a simplified group of characteristic value sets; storing a plurality of templates by a template storage module; and comparing the simplified group of characteristic value sets with the plurality of templates a recognition module to recognize a specific object in the captured image.

Wherein, the predetermined condition is determined by differences between the deleted first characteristic value set and the second characteristic value sets, and the deleted characteristic value set is replaced by the second characteristic value set with the least difference.

Wherein, the lookup table is established by using a characteristic value set with entropy lower than a threshold value of the entropy of the characteristic value set.

Wherein, the simplified group of characteristic value sets comprises a rotated characteristic value set corresponding to each characteristic value set in the simplified group of characteristic value sets, after the simplification process is executed.

Wherein, the simplified group of characteristic value sets comprises a mirrored characteristic value set corresponding to each characteristic value set in the simplified group of characteristic value sets, after the simplification process is executed.

Wherein, the plurality of templates are established by using a characteristic value set existing in the lookup table and by a boosting, a support vector machine (SVM) or a principal component analysis+linear discriminant analysis (PCA+LDA).

In summation, the image capturing device capable of simplifying characteristic value sets of captured images and a control method thereof in accordance with the present invention have one or more of the following advantages:

(1) The image capturing device capable of simplifying characteristic value sets of captured images and the control method thereof can simplify the types of the characteristic value sets in the characteristic images to lower the memory requirement of the image capturing device significantly and reduce the manufacturing cost.

(2) The image capturing device capable of simplifying characteristic value sets of captured images and the control method thereof can decrease the types of the characteristic value sets in the characteristic images to save the computing resource of the image capturing device and improve the efficiency.

(3) The image capturing device capable of simplifying characteristic value sets of captured images and the control method thereof can replace each deleted characteristic value set by a characteristic value set with the least difference instead of deleting the characteristic value set directly, so that the accuracy of detecting objects will not be reduced.

(4) Although the image capturing device capable of simplifying characteristic value sets of captured images and the control method thereof simplifies the types of the characteristic value sets in the characteristic images, each characteristic value set in the simplified group of characteristic value sets has a corresponding rotated or mirrored characteristic value set, so that the original characteristics of the group of characteristic value sets can be maintained for the execution of related applications.

DETAILED DESCRIPTION OF THE PREFERRED EMBODIMENTS

The technical contents and characteristics of the image capturing device and its image processing method in accordance with the present invention will be apparent with the detailed description of a preferred embodiment accompanied with related drawings as follows. For simplicity, same numerals are used in the following preferred embodiment to represent respective same elements.

Figure 1:
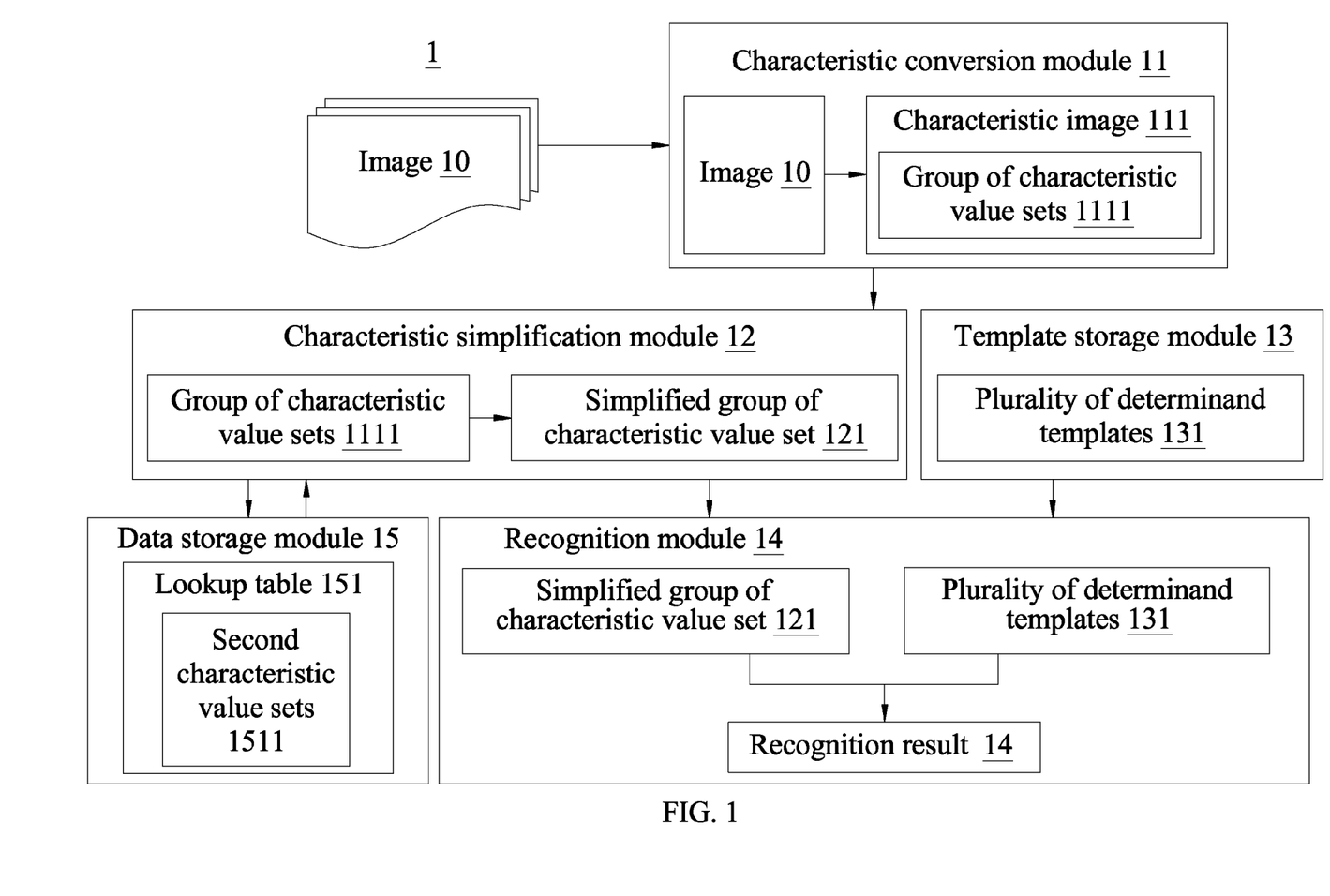
FIG. 1 is a block diagram of an image capturing device capable of simplifying characteristic value sets of captured images in accordance with a first preferred embodiment of the present invention.

With reference to FIG. 1 for a block diagram of an image capturing device capable of simplifying characteristic value sets of captured images in accordance with a first preferred embodiment of the present invention, the image capturing device 1 comprises a characteristic conversion module 11, a characteristic simplification module 12, a template storage module 13, a recognition module 14 and a data storage module 15. The characteristic conversion module 11 can convert an image 10 captured by the image capturing device 1 into a characteristic image 111, wherein the characteristic image 111 includes a group of first characteristic value sets 1111 comprised of a plurality of first characteristic value sets.

The data storage module 15 can store a lookup table 151 which comprises the second characteristic value sets 1511.

The characteristic simplification module 12 can execute a simplification process according to a lookup table 151 stored in the data storage module 15 and delete a first characteristic value set not existing in the lookup table 151, and replace each deleted first characteristic value set by a second characteristic value set 1511 matching with a predetermined condition and existing in a lookup table 151 to generate a simplified group of characteristic value sets 121.

It is noteworthy to point out that the predetermined condition can be determined by differences between the deleted first characteristic value set and the second characteristic value sets 1511. Each deleted first characteristic value set can be replaced by a second characteristic value set 1511 with the least difference instead of directly deleting the characteristic value set not existing in the lookup table. The advantage of this method resides on showing the characteristic value set can be replaced by a characteristic value set with the least difference, and thus it can be kept. In the meantime, the types of characteristic value sets in the group of first characteristic value sets 1111 can be decreased. Therefore, the memory requirement of the image capturing device 1 can be reduced without affecting the accuracy of detecting objects of the image capturing device.

Finally, the recognition module 14 compares the simplified group of characteristic value sets 121 with the plurality of templates 131 stored in the template storage module 13 to generate a recognition result 141, so as to recognize a specific object in the image 10.

It is noteworthy to point out that although the present invention deletes the characteristic value set not existing in the lookup table, yet each simplified characteristic value set can still be matched with a corresponding rotated or mirrored characteristic value set. In other words, the simplified group of characteristic value sets 121 still can maintain the original characteristics of the characteristic value set 1111, so that these characteristics can be used for the application on detecting various different objects.

Of course, the plurality of templates 131 stored in the template storage module 13 are also established by the characteristic value set matched with the predetermined condition set by the threshold value, so that the templates 131 can be compared with the simplified group of characteristic value sets 121 to recognize a target object.

Figure 2:
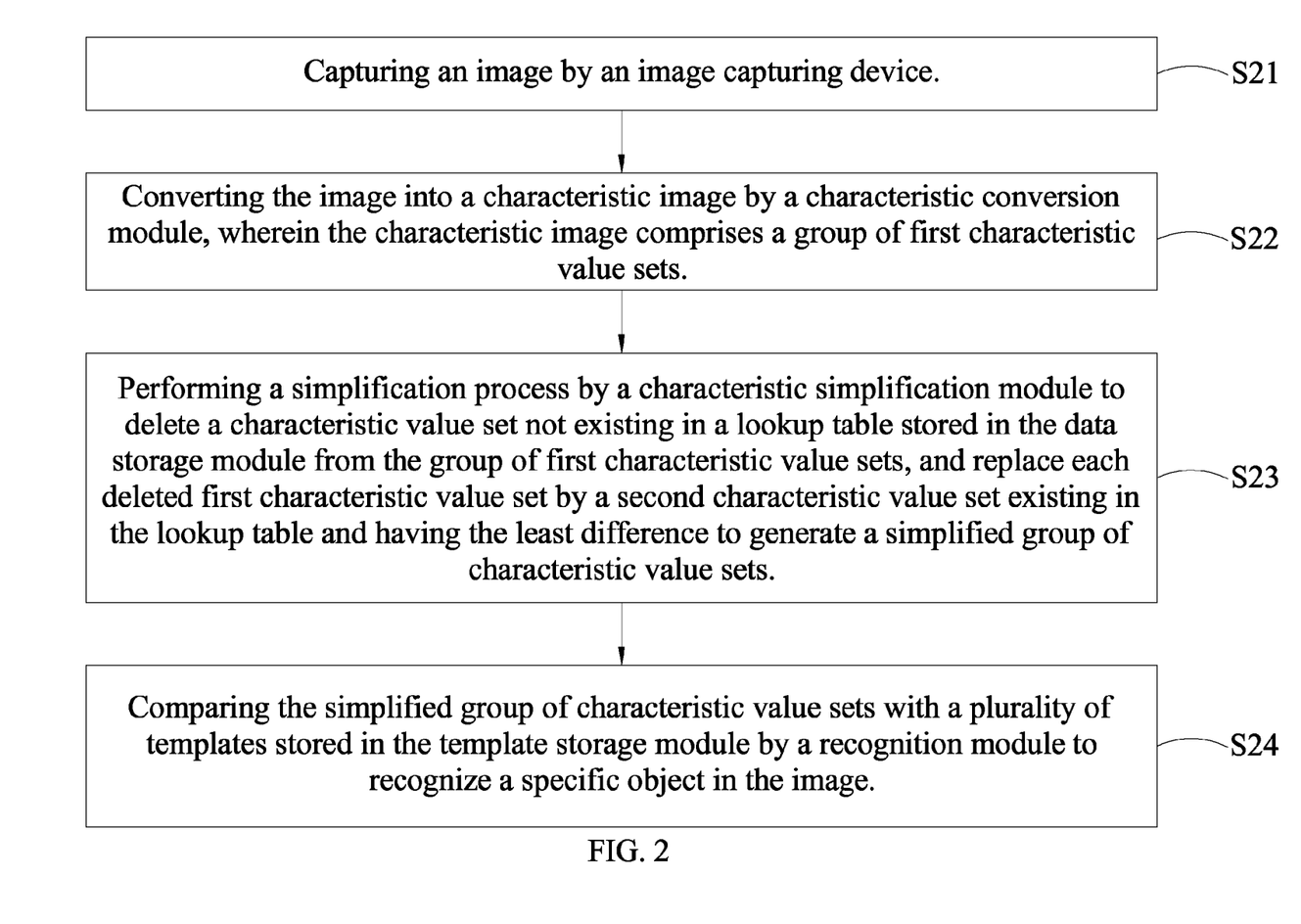
FIG. 2 is a flow chart of an image capturing device capable of simplifying characteristic value sets of captured images in accordance with the first preferred embodiment of the present invention.

With reference to FIG. 2 for a flow chart of an image capturing device capable of simplifying characteristic value sets of captured images in accordance with the first preferred embodiment of the present invention, the image capturing device is operated according to the following steps.

S21: Capturing an image by an image capturing device.

S22: Converting the image into a characteristic image by a characteristic conversion module, wherein the characteristic image comprises a group of first characteristic value sets.

S23: Performing a simplification process by a characteristic simplification module to delete a characteristic value set not existing in a lookup table stored in the data storage module from the group of first characteristic value sets, and replace each deleted first characteristic value set by a second characteristic value set existing in the lookup table and having the least difference to generate a simplified group of characteristic value sets.

S24: Comparing the simplified group of characteristic value sets with a plurality of templates stored in the template storage module by a recognition module to recognize a specific object in the image.

The image capturing device capable of simplifying characteristic value sets of captured images and a control method thereof in accordance with the present invention can be applied in any camera device with an object recognition function, such as a digital still camera, a digital camera, a monitor or even a camera phone to execute the recognition of human faces, pedestrians, license plates, motor vehicles or any other objects. In a preferred embodiment, the digital camera is adopted for recognizing a human face, but the present invention is not limited to such application only.

Figure 3:
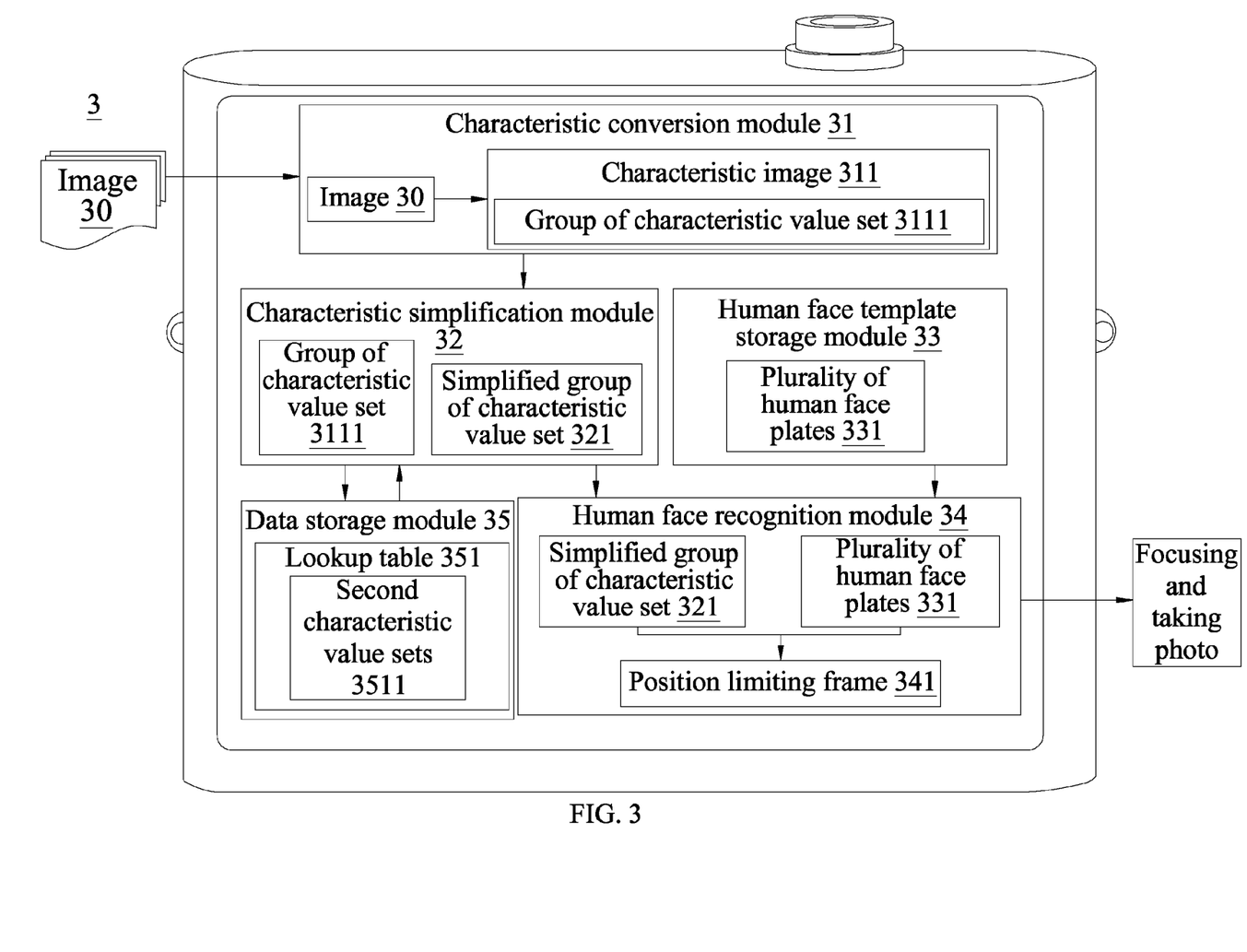
FIG. 3 is a block diagram of an image capturing device capable of simplifying characteristic value sets of captured images in accordance with a second preferred embodiment of the present invention.

With reference to FIG. 3 for a block diagram of an image capturing device capable of simplifying characteristic value sets of captured images in accordance with a second preferred embodiment of the present invention, the digital camera 3 of the present invention comprises a characteristic conversion module 31, a characteristic simplification module 32, a human face template storage module 33, a human face recognition module 34 and a data storage module 35. The characteristic conversion module 31 can convert an image 30 captured by the characteristic image 311 of the digital camera 3, and the characteristic image 311 comprises a group of first characteristic value sets 3111 comprised of a plurality of first characteristic value sets.

The data storage module 35 can store a lookup table 351 which comprises the second characteristic value sets 3511.

The characteristic simplification module 32 executes a simplification process according to a lookup table 35, and the lookup table 351 is determined by a threshold value of the entropy of each characteristic value set, and any first characteristic value set with the entropy greater than the threshold value is deleted, and any first characteristic value set with the entropy less than the threshold value is kept, and deleted first characteristic value set is replaced by a second characteristic value set 3511 with the least difference to generate a simplified group of characteristic value sets 321.

To maintain the original characteristics of the group of characteristic value sets 3111, the characteristic simplification module 32 will further keep the rotated or mirrored characteristic value set corresponding to each of characteristic value sets in the simplified group of characteristic value sets 321 to execute various human face recognition functions.

Finally, the human face recognition module 34 compares the simplified group of characteristic value sets 321 with the plurality of human face templates 331 stored in the human face template storage module 33 to generate a position limiting frame 341 to recognize a human face in the image 30, so that users can use a digital camera 3 for focusing and taking a photo after the recognition is completed.

In addition, the plurality of human face templates 331 are established by a boosting, a support vector machine (SVM) or a principal component analysis+linear discriminant analysis (PCA+LDA) algorithm based on the characteristic value sets with lower entropy and existing in the lookup table 351.

It is noteworthy to point out that when the conventional image capturing device converts the image into the characteristic image, the utility of each characteristic value set included in the characteristic image varies, and some are frequently used and others are rarely used. For example, an image with a resolution of 1920×1080, wherein each pixel includes a characteristic value set, and there is a total of 500 types of different characteristic value sets, and only 250 types are frequently used, but the other 250 types are rarely used. The frequency of using a characteristic value set relates to the entropy. In general, the lower the entropy, the more regular, highly expressive, and frequently used is the characteristic value set.

Based on the concept of the present invention, the entropy of each characteristic value set is analyzed to create a lookup table, and a more regular, highly expressive, and frequently used characteristic value set is kept according to the lookup table, and the characteristic value set with higher entropy is deleted. Deleted characteristic value set is replaced by a characteristic value set with a less entropy and having the least difference and existing in lookup table. Therefore, the invention not only can keep the expressive power of each deleted characteristic value set, but also can decrease the types of the characteristic value sets.

Figure 4:
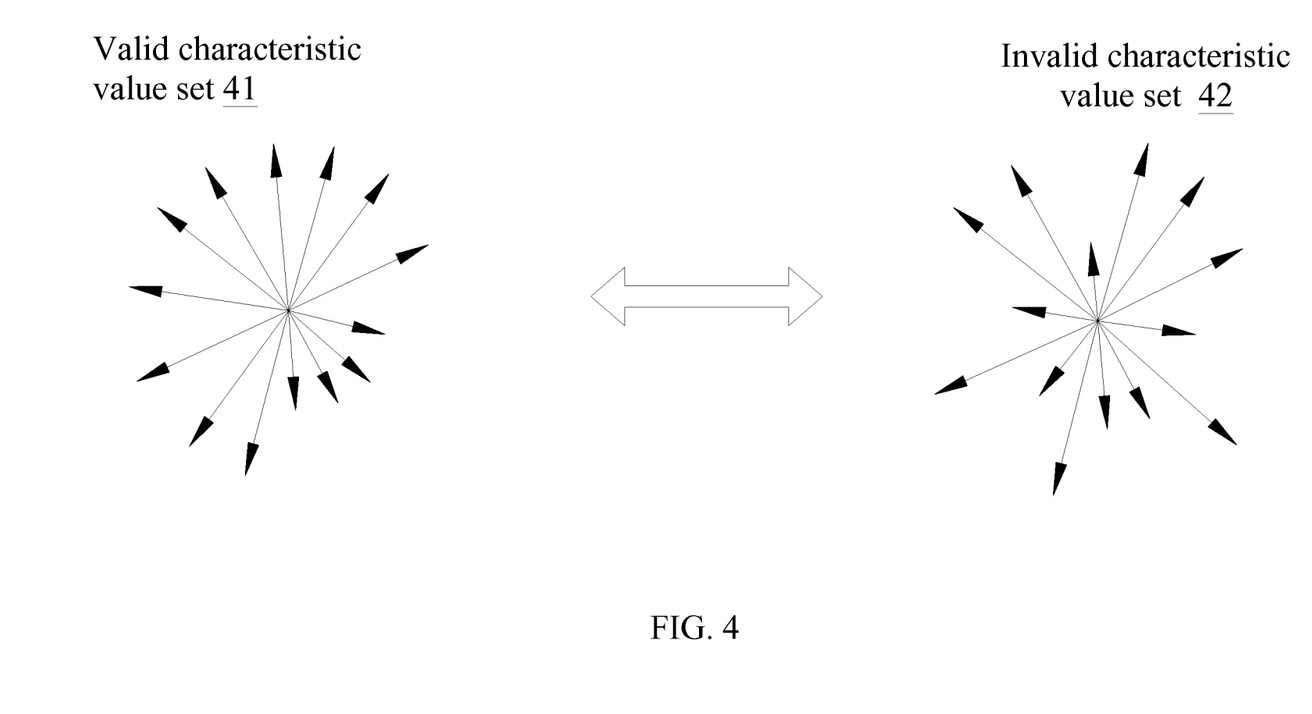
FIGS. 4 and 5 are schematic views of a characteristic value set in accordance with the first preferred embodiment of the present invention.

With reference to FIG. 4 for a schematic view of a characteristic value set in accordance with a preferred embodiment of the present invention, each characteristic value in a valid characteristic value set 41 has a regular arrangement, and each characteristic value in an invalid characteristic value set 42 has a scattered arrangement. Since the invalid characteristic value set 42 has the scattered arrangement, the expressive power is less, and the utility frequency is lower. The threshold value of the characteristic simplification module of the present invention is used for analyzing the entropy of each characteristic value set, and any characteristic value set 42 with the entropy not matched with the threshold value is deleted.

Figure 5:
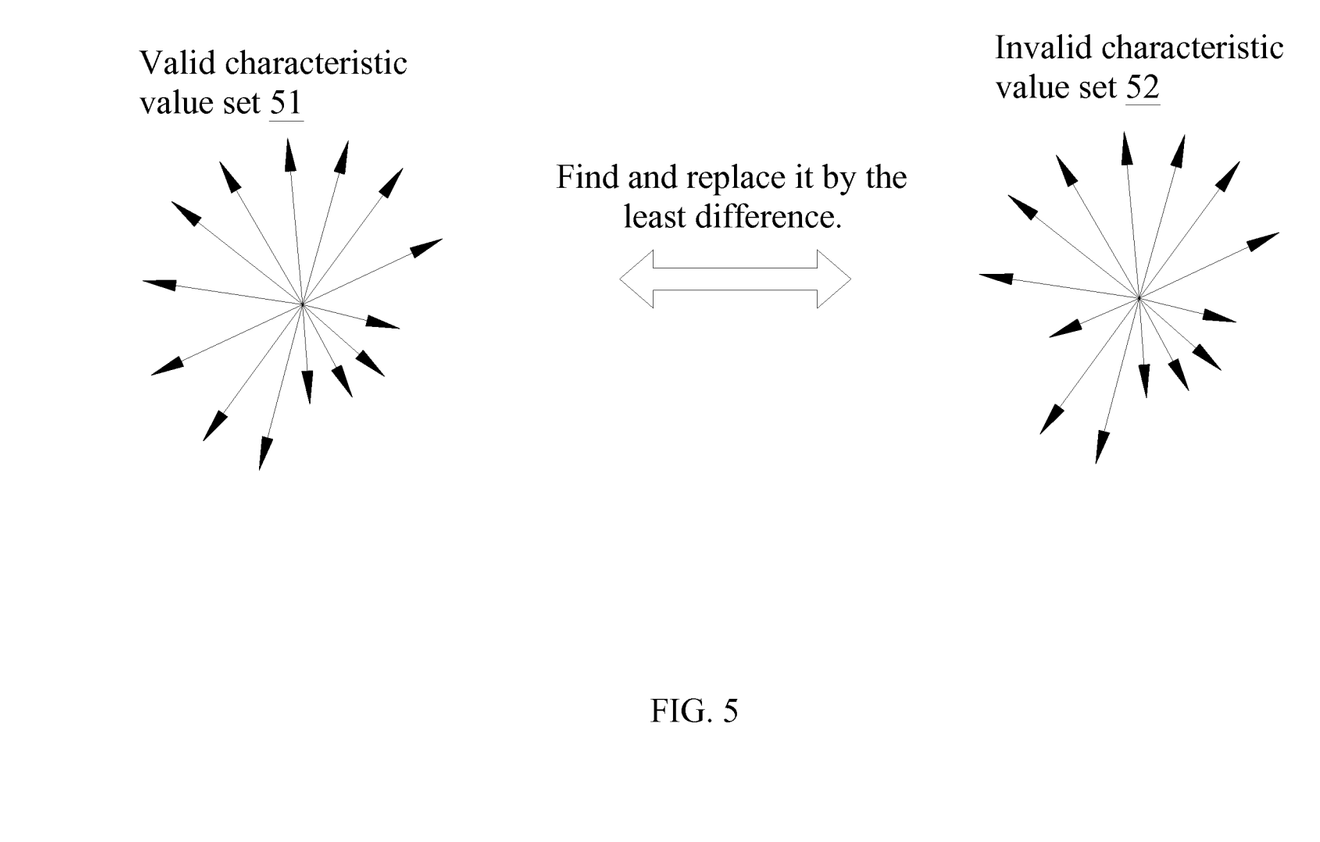

With reference to FIG. 5 for a schematic view of a characteristic value set in accordance with a preferred embodiment of the present invention, the invalid characteristic value set 52 has scattered arrangement and higher entropy. After the invalid characteristic value set 52 is deleted, the characteristic simplification module of the present invention replace the invalid characteristic value set 52 by a valid characteristic value set 51 with less difference and better regularity.

In the figure, the difference of a characteristic value exists between the valid characteristic value set 51 and the invalid characteristic value set 52. The characteristic simplification module of the present invention analyzes the entropy of each characteristic value to find and delete the invalid characteristic value set 52, and replace the deleted invalid characteristic value set 52 by a valid characteristic value set 51 with the least difference. The expressive powers of the valid characteristic value set 51 and the invalid characteristic value 52 are very close, so that the valid characteristic value set 51 can be used to replace the invalid characteristic value 52. Therefore, the characteristic value sets of the simplification module simplified group will not lose their original expressive power after being processed, and the image capturing device still maintain its original accuracy of recognizing objects. In addition, the characteristic value sets are represented differently in different algorithms. For example, there exists a difference in the number of arrowheads, but the method of the present invention can be used for the simplification.

It is noteworthy to point out that the types of characteristic value sets relates closely to the memory requirement of the image capturing device, so that the method of the present invention can simplify the characteristic value sets to reduce the memory requirement of the image capturing device significantly through. On the other hand, the types of the characteristic value set are decreased, and the computing resource of the image capturing device can be saved significantly, so that the image capturing device can be more efficient. Through actual testing, the internal memory (RAM) of the digital camera can be reduced by 34% and the ROM size can be reduced by 36% without affecting the quality of the detection. Obviously, the present invention can reduce the memory size required by the image capturing device.

Figure 6:
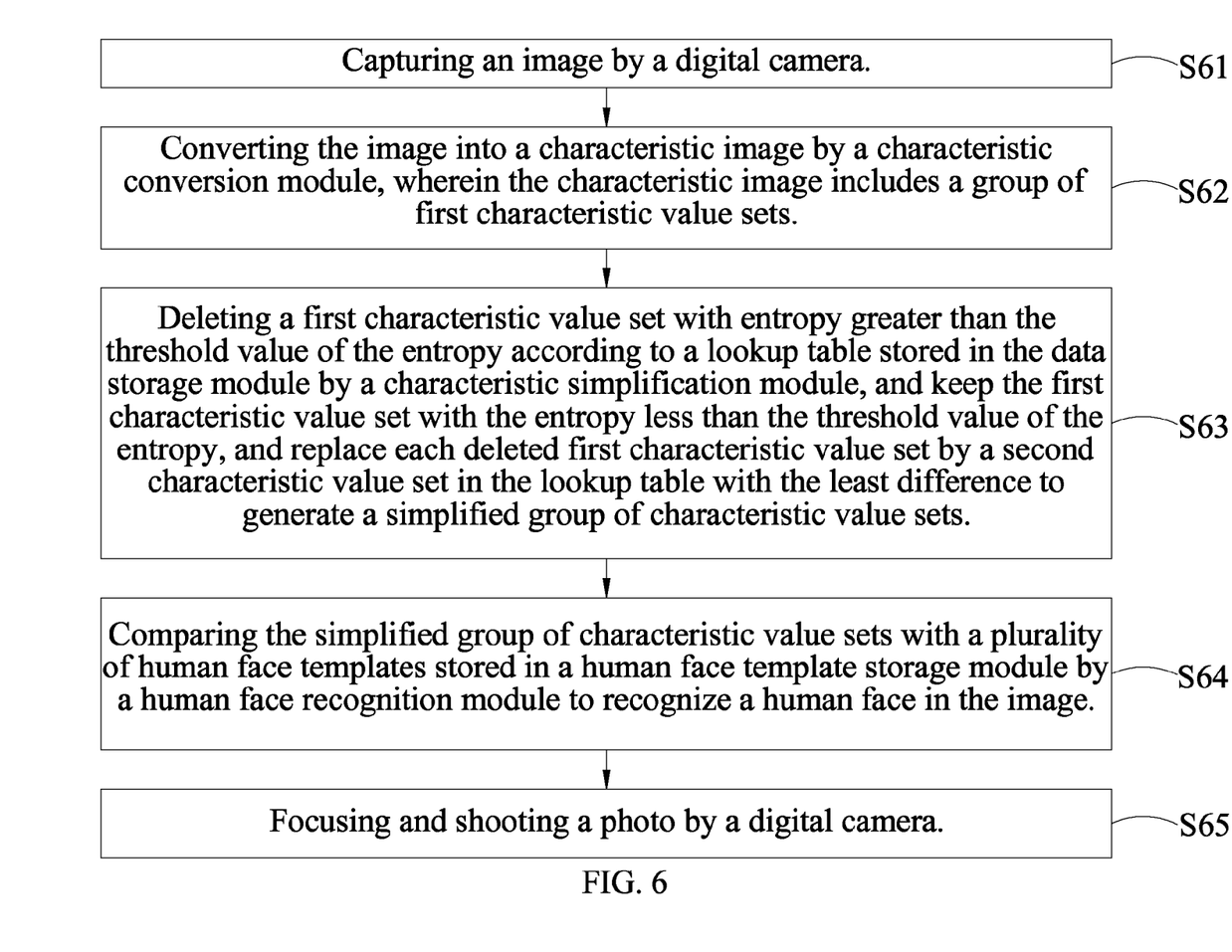
FIG. 6 is a flow chart of an image capturing device capable of simplifying characteristic value sets of captured images in accordance with the second preferred embodiment of the present invention.

With reference to FIG. 6 for a flow chart of an image capturing device capable of simplifying characteristic value sets of captured images in accordance with the second preferred embodiment of the present invention, the image capturing device is operated according to the following steps.

S61: Capturing an image by a digital camera.

S62: Converting the image into a characteristic image by a characteristic conversion module, wherein the characteristic image includes a group of first characteristic value sets.

S63: Deleting a first characteristic value set with entropy greater than the threshold value of the entropy according to a lookup table stored in the data storage module by a characteristic simplification module, and keep the first characteristic value set with the entropy less than the threshold value of the entropy, and replace each deleted first characteristic value set by a second characteristic value set in the lookup table with the least difference to generate a simplified group of characteristic value sets.

S64: Comparing the simplified group of characteristic value sets with a plurality of human face templates stored in a human face template storage module by a human face recognition module to recognize a human face in the image.

S65: Focusing and shooting a photo by a digital camera.

Figure 7:
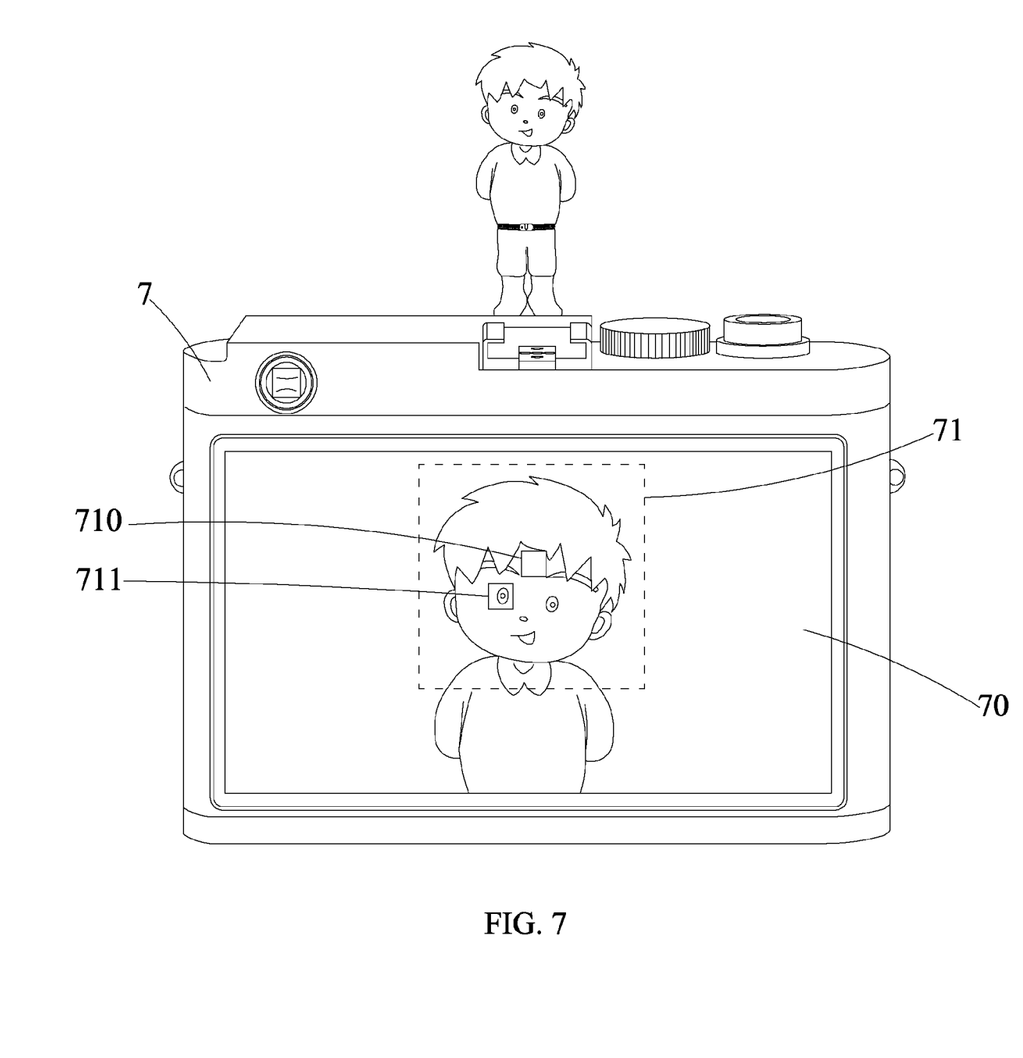
FIG. 7 is a flow chart of an image capturing device capable of simplifying characteristic value sets of captured images in accordance with a third preferred embodiment of the present invention.

With reference to FIG. 7 for a flow chart of an image capturing device capable of simplifying characteristic value sets of captured images in accordance with the third preferred embodiment of the present invention, this preferred embodiment adopts the Haar-like features algorithm. In FIG. 7, the Haar-like features algorithm uses a window 71 to scan an image 70 captured by a digital camera 7, and then the window 71 is divided into two or more blocks, added or subtracted, and then converted into a characteristic signal. The block 710 is situated at a forehead position of a human face, so that the signal captured by the block 710 is a signal with a lighter color, and the block 711 is situated at an eye position of the human face, so that the signal captured by the block 711 is a signal with a darker color. The signal captured by the block 711 is subtracted from the block 710 know that the signals captured by both have a greater difference, and determines that the window 71 probably situates at the position of the human face.

The aforementioned method is a more regular and frequently used comparison method with less entropy. In addition, several blocks situated at different positions in the window 71 are added or subtracted, but this method is a less regular or less frequently used comparison method, and can be replaced by the comparison method using less entropy. With the method of the present invention, the lookup table is provided for executing the simplification process to delete the characteristic set values with higher entropy and less utility, so as to reduce the memory requirement of the digital camera 7 effectively.

Figure 8:
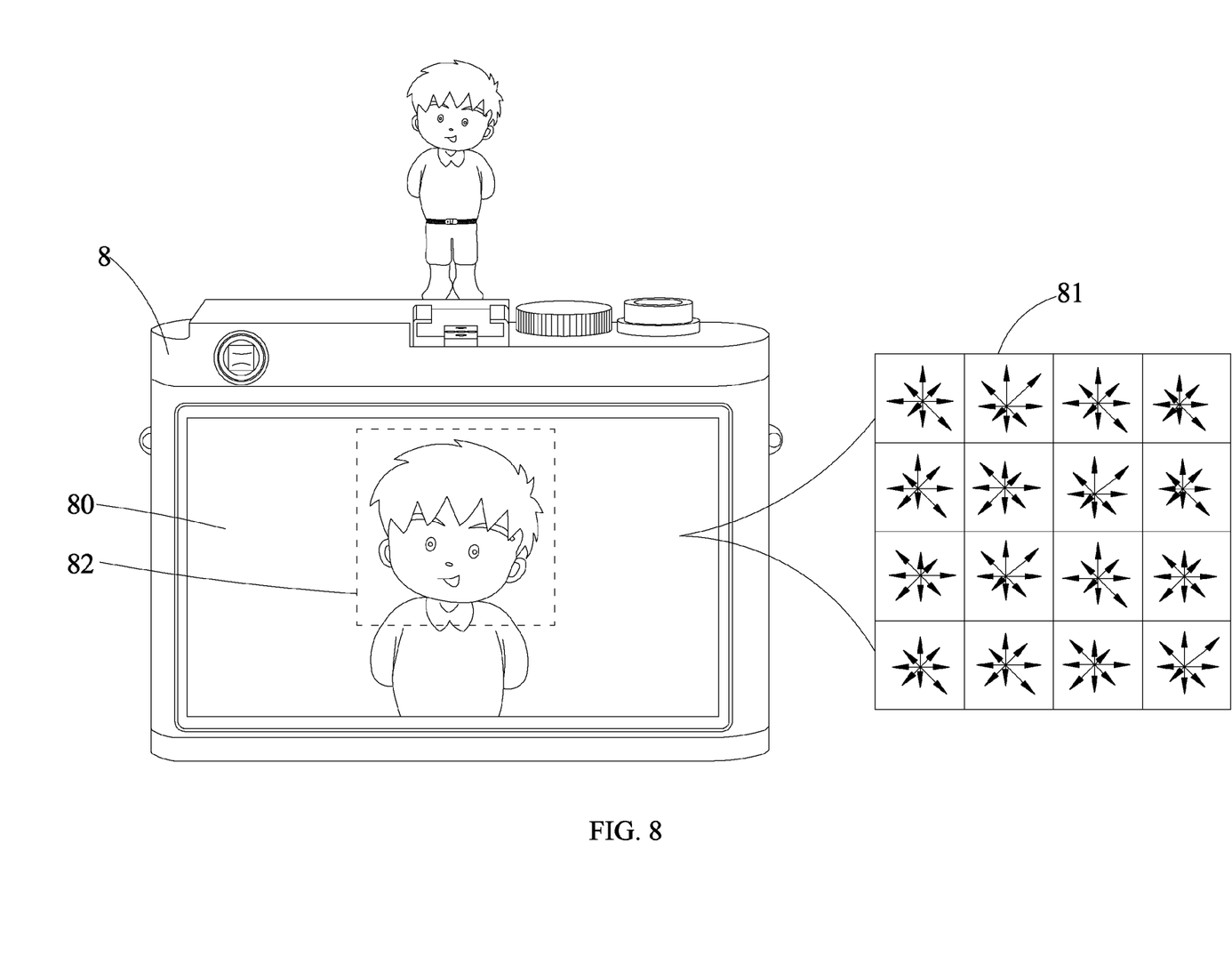
FIG. 8 is a flow chart of an image capturing device capable of simplifying characteristic value sets of captured images in accordance with a fourth preferred embodiment of the present invention.

With reference to FIG. 8 for a flow chart of an image capturing device capable of simplifying characteristic value sets of captured images in accordance with the fourth preferred embodiment of the present invention, this preferred embodiment adopts a Histogram of Oriented Gradient (HOG) to illustrate the concept of the present invention.

In FIG. 8, a user uses a digital camera 8 to take a photo of a character, and a characteristic conversion module of the digital camera 8 uses the HOG algorithm to convert an image 80 into a group of characteristic value sets 81 comprised of a plurality of characteristic value sets. The characteristic simplification module executes a simplification process to delete the characteristic value set with entropy greater than a threshold value of the entropy according to a lookup table, and replace the deleted characteristic value set by a characteristic value set with the least difference. The human face recognition module compares the simplified result with templates pre-stored in the human face template storage module to generate a position limiting frame 82. After the human face detection is completed, users can perform focusing and taking the photo.

Even though the concept of a control method of simplifying the image characteristic value set of the present invention has been described in the process of the image capturing device capable of simplifying characteristic value sets of captured images already, the following flow chart is provided for illustrating and describing the invention in details.

Figure 9:
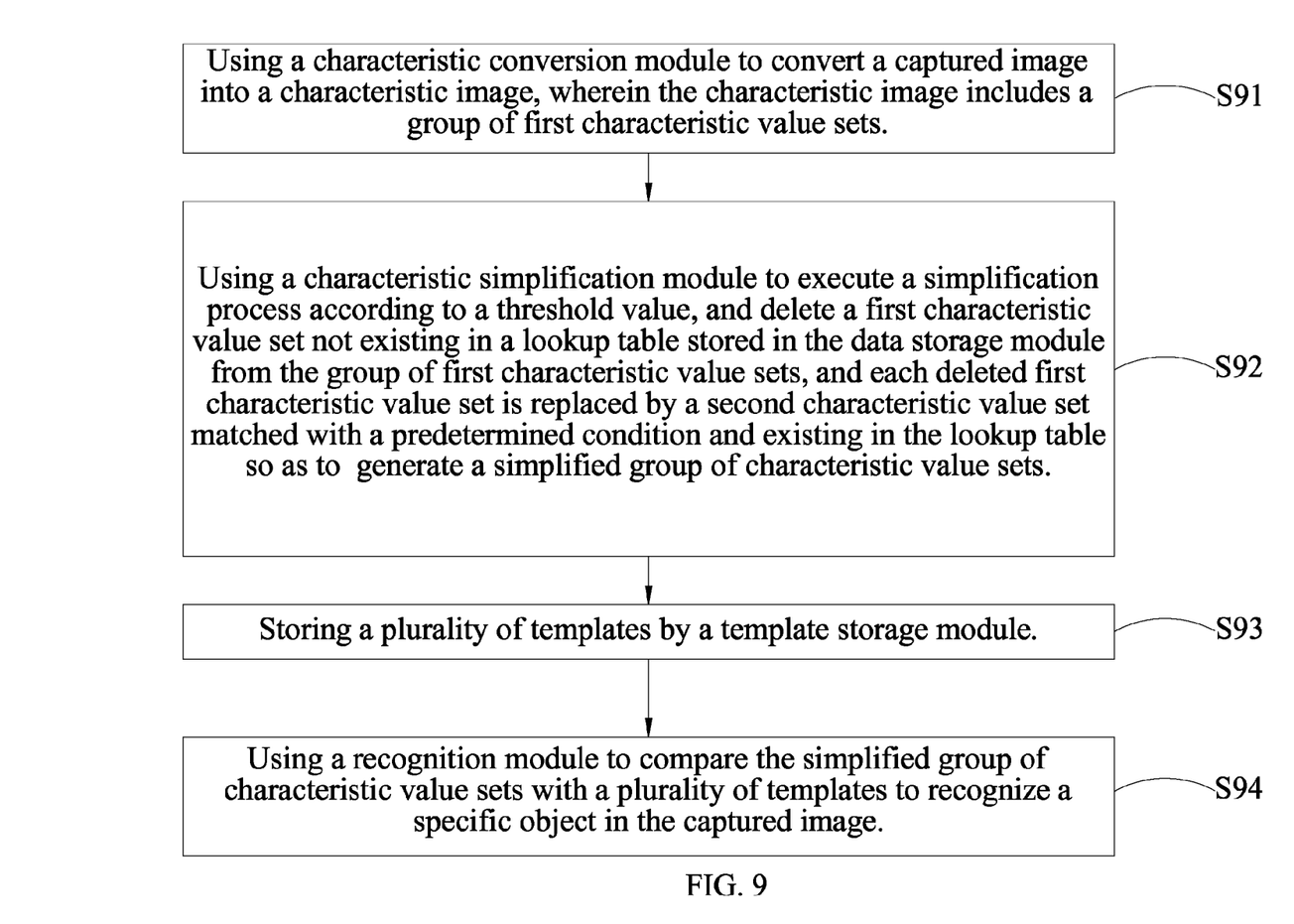
FIG. 9 is a flow chart of a control method capable of simplifying a characteristic value set of an image in accordance with the present invention.

With reference to FIG. 9 for a flow chart of a control method capable of simplifying a characteristic value set of an image in accordance with the present invention, the control method comprises the following steps.

S91: Using a characteristic conversion module to convert a captured image into a characteristic image, wherein the characteristic image includes a group of first characteristic value sets.

S92: Using a characteristic simplification module to execute a simplification process according to a threshold value, and delete a first characteristic value set not existing in a lookup table stored in the data storage module from the group of first characteristic value sets, and deleted first characteristic value set is replaced by a second characteristic value set matched with a predetermined condition and existing in the lookup table so as to generate a simplified group of characteristic value sets.

S93: Storing a plurality of templates by a template storage module.

S94: Using a recognition module to compare the simplified group of characteristic value sets with a plurality of templates to recognize a specific object in the captured image.

The detailed description and implementation method of the control method of simplifying image characteristic value sets in accordance with the present invention has been described in the section of the image capturing device capable of simplifying characteristic value sets of captured images, and thus will not be described again.

In summation of the description above, the image capturing device capable of simplifying characteristic value sets of captured images and the control method thereof in accordance with the present invention can simplify the types of the characteristic value sets in the characteristic images to reduce the memory requirement and the manufacturing cost of the image capturing device significantly. The present invention can decrease the types of the characteristic value sets in the characteristic images to save the computing resource of the image capturing device and improve the efficiently significantly. The present invention replaces each deleted characteristic value set by a characteristic value with the least difference instead of deleting the characteristic value set directly, so that it will not affect the accuracy of detecting objects. The rotated or mirrored characteristic value set corresponding to each of characteristic value sets in the simplified group of characteristic value sets can be kept to maintain the original characteristics of the group of characteristic value sets can in order to execute related applications. Therefore, the present invention can overcome the shortcomings of the prior art.

What is claimed is:

1. An image capturing device capable of simplifying characteristic value sets of captured images, comprising:
    a characteristic conversion unit, for converting a captured image into a characteristic image which includes a group of first characteristic value sets;
    a data storage unit, for storing a lookup table which comprises second characteristic value sets;
    a characteristic simplification unit, for executing a simplification process according to the lookup table, and deleting the first characteristic value set not existing in the lookup table from the group of first characteristic value sets, and replacing each deleted first characteristic value set by the second characteristic value set matching with a predetermined condition and existing in the lookup table, so as to generate a simplified group of characteristic value sets;
    a template storage unit, for storing a plurality of templates; and
    a recognition unit, for comparing the simplified group of characteristic value sets with the plurality of templates to recognize a specific object in the captured image;
    wherein the predetermined condition is determined by differences between the deleted first characteristic value set and the second characteristic value sets, and the deleted first characteristic value set is replaced by the second characteristic value set with the least difference, and the lookup table is established by using a characteristic value set with entropy less than a threshold value of an entropy of the characteristic value set.

2. The image capturing device capable of simplifying characteristic value sets of captured images as recited in claim 1, wherein the simplified group of characteristic value sets comprises a rotated characteristic value set corresponding to each characteristic value set in the simplified group of characteristic value sets, after the simplification process is executed.

3. The image capturing device capable of simplifying characteristic value sets of captured images as recited in claim 1, wherein the simplified group of characteristic value sets comprises a mirrored characteristic value set corresponding to each characteristic value set in the simplified group of characteristic value sets, after the simplification process is executed.

4. The image capturing device capable of simplifying characteristic value sets of captured images as recited in claim 1, wherein the plurality of templates are established by using a characteristic value set existing in the lookup table and by a boosting, a support vector machine (SVM) or a principal component analysis+linear discriminant analysis (PCA+LDA).

5. A control method capable of simplifying a characteristic value set of images, comprising the steps of:
    converting a captured image into a characteristic image by a characteristic conversion unit, and the characteristic image including a group of first characteristic value sets;
    storing a lookup table by a data storage unit, the lookup table comprising second characteristic value sets;
    executing a simplification process by a characteristic simplification unit according to the lookup table, and deleting the first characteristic value set not existing in the lookup table from the group of first characteristic value sets, and replacing each deleted first characteristic value set by the second characteristic value set matching with a predetermined condition and existing in the lookup table, so as to generate a simplified group of characteristic value sets;
    storing a plurality of templates by a template storage unit; and
    comparing the simplified group of characteristic value sets with the plurality of templates by a recognition unit to recognize a specific object in the captured image;
    wherein the predetermined condition is determined by differences between the deleted first characteristic value set and the second characteristic value sets, and the deleted first characteristic value set is replaced by the second characteristic value set with the least difference, and the lookup table is established by using a characteristic value set with entropy less than a threshold value of an entropy of the characteristic value set.

6. The control method capable of simplifying a characteristic value set of images as recited in claim 5, wherein the simplified group of characteristic value sets comprises a rotated characteristic value set corresponding to each characteristic value set in the simplified group of characteristic value sets, after the simplification process is executed.

7. The control method capable of simplifying a characteristic value set of images as recited in claim 5, wherein the simplified group of characteristic value sets comprises a mirrored characteristic value set corresponding to each characteristic value set in the simplified group of characteristic value sets, after the simplification process is executed.

8. The control method capable of simplifying a characteristic value set of images as recited in claim 5, wherein the plurality of templates are established by using a characteristic value set existing in the lookup table and by a boosting, a support vector machine (SVM) or a principal component analysis+linear discriminant analysis (PCA+LDA).

* * * * *